June 20, 1967           G. CORNING           3,326,498

ZERO FIELD LENGTH AIRCRAFT

Filed March 29, 1965

INVENTOR
GERALD CORNING

BY *John J. Byrne*

ATTORNEY

United States Patent Office 3,326,498
Patented June 20, 1967

3,326,498
ZERO FIELD LENGTH AIRCRAFT
Gerald Corning, 10420 Burnt Ember Drive,
Silver Spring, Md. 20903
Filed Mar. 29, 1965, Ser. No. 443,719
5 Claims. (Cl. 244—12)

This invention relates to aircraft and more particularly relates to heavier-than-air craft requiring a minimum of take-off and landing space.

The desire to create a modern aircraft of a type requiring a zero-length runway has been the subject matter of a great amount of research and development work. Workers in the prior art have developed many ingenious constructions for accomplishing this function. Among the more popular developments are those relating to helicopters, vertical take-off rocket and jet craft, airplanes having power units rotatable with respect to the fuselage or wings, airplanes having wing-mounted power units with the wing assembly rotatable with respect to the fuselage, and craft with separate power units operating during only take-off or crusing but not both. The limitations and advantages of each of these developments are too numerous to mention here but none have met with popular favor either because of difficulty of control, costliness of construtcion or unreliability in flight.

A principal objective of this invention is to provide an aircraft with the ability to rise from a zero length take-off platform or strip using the same power plants for take-off and cruise which power plants are fixed relative to the wing and fuselage without introducing the requirements of a movable wing or engine or the further requirement of deflectors for directing the angle of thrust.

Another important objective of the invention is to provide the art with an aircraft having a minimum take-off strip requirement without demanding complicated control structure for rotating elements of the craft for aligning the angles of thrust with respect to the fuselage or wings. It is a further objective of the invention, therefore, to provide a fixed thrust device for an aircraft which is utilized efficiently in take-off, cruising, and landing.

Another important objective of the invention is to provide a rugged, mechanically simple, less expensive and safe zero field length aircraft gaining these characteristics through a novel fixed placement of power plants with respect to the craft.

In general, the aircraft of this invention is constructed by mounting the power units in such a manner that the thrust line intersects the center of gravity of the plane at an angle where the vertical thrust component is greater than the weight of the aircraft at take-off and, upon a rotation of the plane about a transverse axis, its attitude is arranged whereby the main component of thrust is used for cruising.

Further objectives and advantages of the present invention will be apparent from the following description, reference being had to the accompanying drawings wherein.

Figure 1:
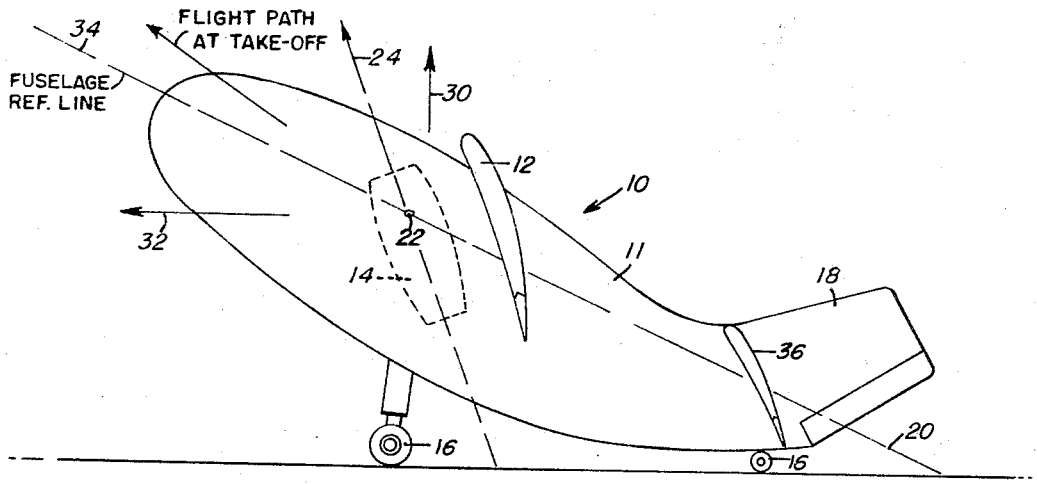
FIGURE 1 is a side elevation view of the aircraft disposed for take-off.

Referring now to the drawings wherein like numerals indicate like parts, the numeral 10 indicates the aircraft of this invention. The aircraft is comprised generally of a fuselage 11, a wing 12, a power unit 14, telescoping landing gear 16 and a tail assembly 18. Although the number of power units is immaterial to the invention it is to be understood that in the structure described herein a second unit is mounted on the other side of the craft not disclosed by the drawings. The invention encompasses power units supported directly by, or through, the fuselage as well as wing supported power units.

The longitudinal axis of the fuselage is depicted by the numeral 20, the center of gravity of the aircraft by the numeral 22, and the line of thrust of power unit 14 by the numeral 24. Of importance to the aircraft is that power unit 14 is fixedly secured with respect to the fuselage with its line of thrust intersecting an axis extending outwardly from the center of gravity 22. It should be understood that the resultant line of thrust for both power plants would be through the center of gravity of the aircraft. The power unit is disposed with its line of thrust making an angle of approximately 70° with the ground level as take-off and at an angle approximately 45° to the longitudinal axis 20. In addition, the line of thrust at take-off is not perpendicular to the ground by approximately 70° thereto.

The wing 12, in the embodiment described, is secured to the fuselage in a plane approximately parallel to the major component of thrust 24. The design of the wing and its disposition are well within the knowledge of those skilled in the art. The wing must have sufficient surface to support a certain portion of aircraft weight at cruising speeds to result in an efficient vehicle.

The thrust from the power plant develops a vertical component 30 and a horizontal component 32. The power unit must have the capability of developing a thrust 30 greater than the weight of the craft. The craft will rise along a resultant line of flight 34.

Figure 2:
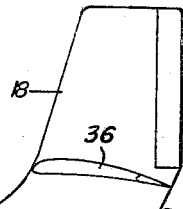
FIGURE 2 is a side elevation view showing aircraft attitude during cruising.
Figure 2:
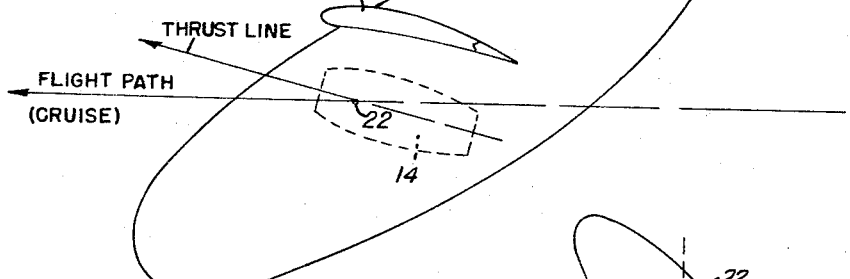

Upon reaching cruising altitudes, the pilot, normally through operation of horizontal tail surface 36, rotates the aircraft about an axis transverse to the direction of flight until the FIGURE 2 cruising attitude is reached. At this attitude, it can be seen that the major thrust component is utilized to develop a forward speed permitting the wing to develop the required lift. This is accomplished through a complete rotation of the aircraft rather than through movement of one part relative to another. A cruising attitude is maintained until descent is desired.

Figure 3:
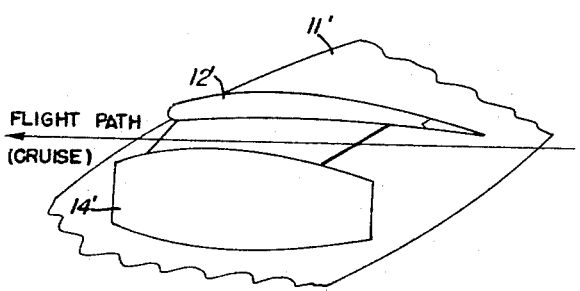
FIGURE 3 is a further embodiment of the invention disclosing the power units mounted on the wings of the aircraft.

The disclosure of FIGURE 3 merely shows a power unit supported by the wing of the craft. It should be understood that the important feature still consists of a fixed relationship of the power unit with the fuselage. The thrust line remains through the center of gravity and at approximately 70° to the horizontal at take-off.

Figure 4:
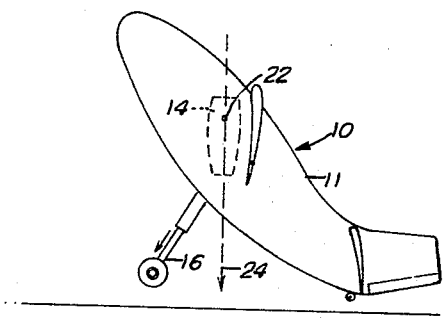
FIGURE 4 is a side elevation view showing aircraft attitude during landing.

Upon reaching the landing destination, the pilot will maneuver the aircraft until thrust line 24 is vertical. This attitude of the aircraft is seen in FIGURE 4. Note that the landing gear 16 is extended to a length causing the aircraft to maintain the landing attitude after ground contact has been made. The aircraft is lowered gently along the vertical thrust line 24 by gradually cutting power. Consequently, there is no horizontal component of thrust when the craft meets the ground. After power cut-off the landing gear is contracted to the position of FIGURE 1. Apparatus, both hydraulic and electrical for so extending the landing gear is an accomplishment well within those skilled in the art.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:
1. An airplane requiring a zero length take-off platform comprising an elongated fuselage, a wing affixed to said fuselage having a configuration for developing a substantial amount of lift when sufficient forward speeds are attained, telescoping means supporting said fuselage on said platform at an angle of approximately 25° to said platform, a power unit, second means securing said power unit to said airplane at a fixed angle of approximately 30°–60° to the longitudinal axis of said fuselage, said power unit having a lifting component of thrust sufficent to raise said airplane to a cruising altitude, and control means to rotate said airplane about an axis transverse to the direction of travel to an attitude bringing said power unit facing said direction of travel whereby said forward movement and lift are accomplished by means of a power unit having a fixed relationship with respect to said fuselage and said wing.

2. The airplane described in claim 1 wherein said power unit is affixed to said wing.

3. The airplane described in claim 1 wherein said power unit is affixed to said fuselage.

4. An airplane of the type requiring a minimum take-off strip comprising an elongated fuselage having a center of gravity intermediate the length thereof, wings extending outwardly from either side of said fuselage, a power plant secured relative to said fuselage having a principal axis of thrust parallel to the plane of said wings, said axis of thrust passing through said center of gravity and disposed at an angle with respect to the longitudinal axis of said airplane whereby at take-off the vertical component of thust of said axis of thrust is greater than the weight of the airplane and under cruising conditions the fuselage is disposed at an efficient angle to the flight path and said principal angle of thrust has a major component of thrust along said flight path.

5. The airplane described in claim 1 wherein said second means secures said power unit to said airplane at a fixed angle of 70° to the platform.

References Cited

UNITED STATES PATENTS

| | | | |
|---|---|---|---|
| 1,841,164 | 1/1932 | Vestvold | 244—13 |
| 1,875,267 | 8/1932 | Savoja | 244—6 |
| 2,868,477 | 1/1959 | Chaplin | 244—12 |

FOREIGN PATENTS 536,148  11/1955  Italy.

MILTON BUCHLER, *Primary Examiner.*

LARRY C. HALL, A. E. CORRIGAN,
*Assistant Examiners.*